(12) United States Patent
Xia (10) Patent No.: US 7,325,297 B2
(45) Date of Patent: Feb. 5, 2008

(54) AUTOMATIC ASSEMBLY MACHINE FOR MOUNTING BEARINGS ONTO MOTORS

(75) Inventor: Jian-Ming Xia, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 559 days.

(21) Appl. No.: 10/900,802

(22) Filed: Jul. 27, 2004

(65) Prior Publication Data

US 2005/0091839 A1     May 5, 2005

(30) Foreign Application Priority Data

Oct. 31, 2003    (TW) .............................. 92219421 U (51) Int. Cl.
*B21D 53/10*     (2006.01)
(52) U.S. Cl. .......................... 29/724; 29/725; 29/732; 29/759; 384/204
(58) Field of Classification Search ................ 29/724, 29/725, 732, 229, 771, 784, 787, 790, 799, 29/898.07, 809, 281, 759; 384/185, 204
See application file for complete search history.

(56) References Cited

U.S. PATENT DOCUMENTS

| | | | | |
|---|---|---|---|---|
| 1,723,369 A | * | 8/1929 | Pew ............................ | 29/785 |
| 3,052,969 A | * | 9/1962 | Loven .......................... | 29/809 |
| 3,137,932 A | * | 6/1964 | Erdmann ...................... | 29/809 |
| 3,191,259 A | * | 6/1965 | Dalton ......................... | 29/720 |
| 3,501,826 A | * | 3/1970 | Marcus ......................... | 29/713 |
| 3,708,849 A | * | 1/1973 | Meyer et al. ................. | 29/785 |
| 3,851,369 A | * | 12/1974 | Eschholz ...................... | 29/717 |
| 4,715,113 A | * | 12/1987 | Wickham ..................... | 29/792 |
| 5,974,660 A | * | 11/1999 | Muller ......................... | 29/823 |

* cited by examiner

*Primary Examiner*—David P. Bryant
*Assistant Examiner*—Alexander P Taousakis
(74) *Attorney, Agent, or Firm*—Wei Te Chung (57) ABSTRACT

An automatic assembly machine includes a basis (10), a sliding device (30) horizontally movably attached on the basis for supporting a fan (40) thereon, a tube (27) fixed to the basis for receiving a plurality of bearings (28) therein, a diversion station for provisionally holding one bearing thereon, a mounting device (70) vertically movably attached to the basis, a horizontal driving device (60), a vertical driving device (80), and a control device (90) for controlling periodical movement of the horizontal and vertical driving devices. In one period, the vertical driving device drives the mounting device to catch the bearing from the diversion station and then the horizontal driving device drives the sliding device and the diversion station to move to allow the diversion station to receive another bearing from the tube and the mounting device to mount said bearing to the fan upon driven of the vertical driving device.

17 Claims, 10 Drawing Sheets

AUTOMATIC ASSEMBLY MACHINE FOR MOUNTING BEARINGS ONTO MOTORS

BACKGROUND OF THE INVENTION

1. Field of the Invention

The present invention relates to automatic assembly machines, and particularly to an automatic assembly machine for assembling bearings to motors such as motors of fans for cooling electronic components.

2. Related Art

Each motor of fans for cooling electronic components comprises at least one bearing. Oftentimes, bearings are assembled to motors by hand. Bearings are first taken out from a packing tube and placed on a tray by hand. An assembling worker assembles the bearings to motors of cooling fans by hand. However, the bearings are small. It is inconvenient for the worker to assemble the bearings to the motors by hand. It is therefore time-consuming. Furthermore, in the assembly process, the hands of the worker need to touch the bearings, which causes the bearings to easily be eroded. Moreover, if the hands of the worker accidentally loose the bearings are prone to fall to the ground, which damages the bearings.

A half-automatic assembling method is developed. A combination of bearings and packing tube is mounted to an automatic transferring device. An assembling worker mounts the bearings to fans by hand after the automatic transferring device sends the bearings out sequentially. However, the worker assembles the bearings to the motors of the fans by hand. The above-mentioned problem is still not overcome.

SUMMARY OF THE INVENTION

Accordingly, an object of the present invention is to provide an automatic assembly machine for efficiently assembling bearings to motors such as motors of fans for cooling electronic components.

To achieve the above-mentioned object, an automatic assembly machine in accordance with the present invention comprises a basis, a sliding device horizontally movably attached on the basis for supporting a fan thereon, a tube fixed to the basis for receiving a plurality of bearings therein, a diversion station for provisionally holding one bearing thereon, a mounting device vertically movably attached to the basis, a horizontal driving device for driving the sliding device and the transferring station, a vertical driving device for driving the mounting device, and a control device for controlling periodical movement of the horizontal and vertical driving devices. In one period the vertical driving device first drives the mounting device to take said bearing from the diversion station and then the horizontal driving device drives the sliding device and the diversion station to move to allow the diversion station to receive another bearing from the tube and the mounting device to mount said bearing to the fan upon driven of the vertical driving device.

Other objects, advantages and novel features of the present invention will be drawn from the following detailed description of a preferred embodiment of the present invention with attached drawings, in which:

DETAILED DESCRIPTION OF THE INVENTION

Figure 1:
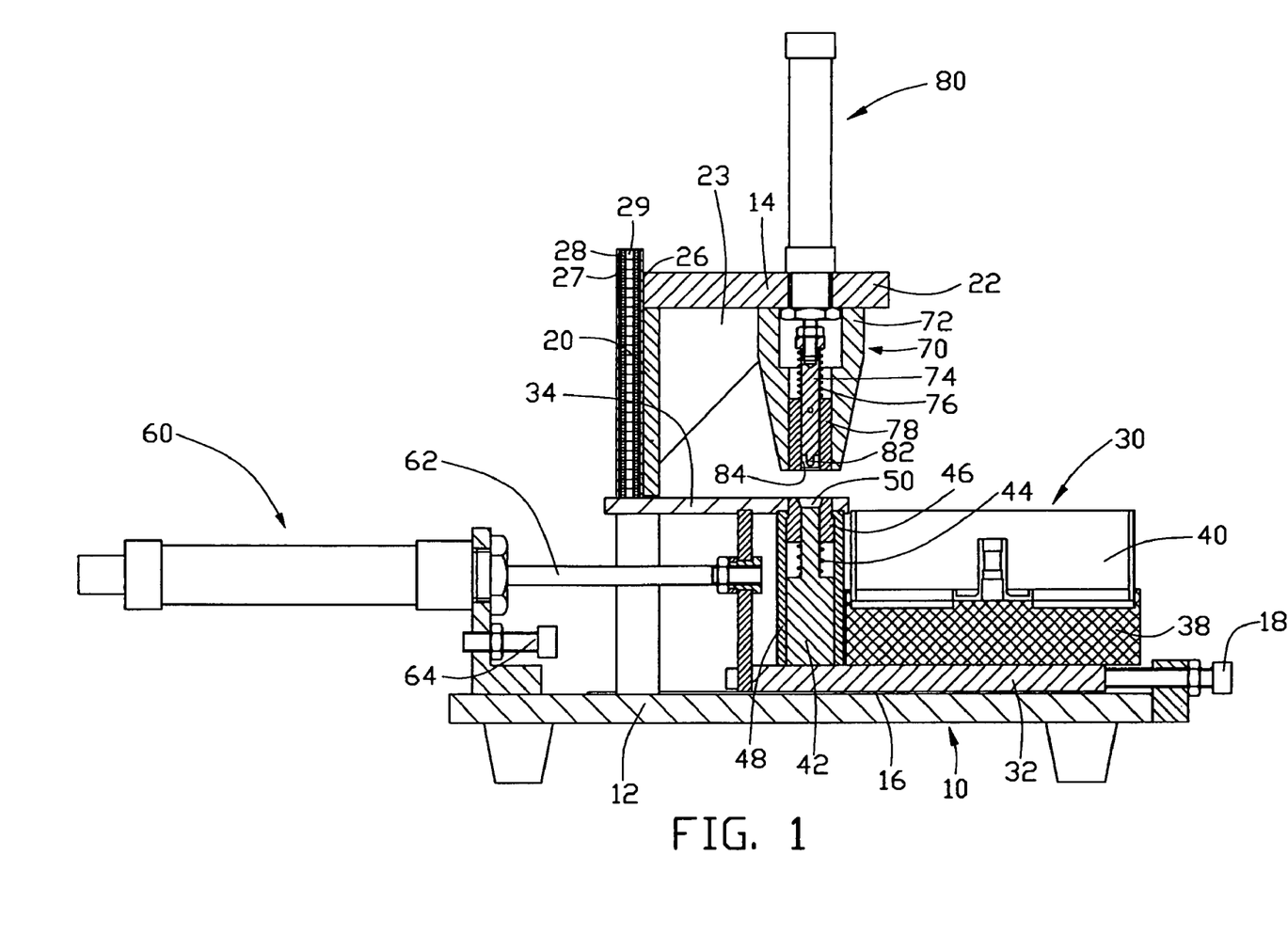
FIG. 1 is a partly sectional view of an automatic assembly machine in accordance with a preferred embodiment of the present invention, together with a fan and a plurality of bearings.
Figure 2:
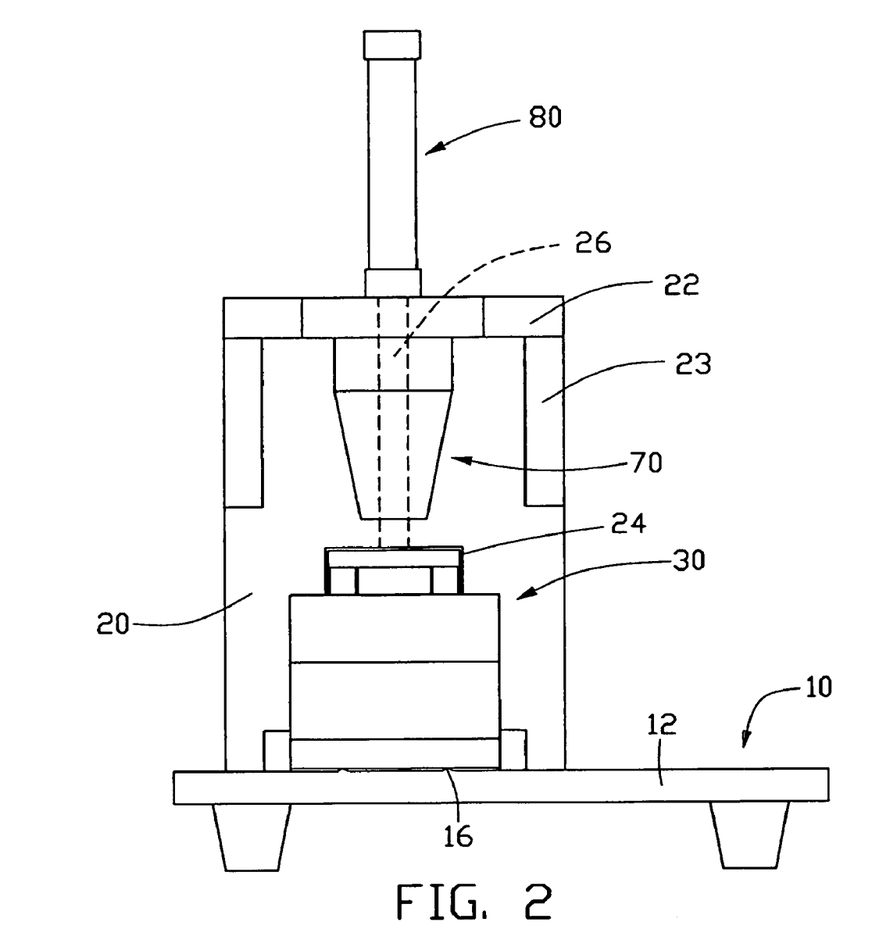
FIG. 2 is a side elevational view of FIG. 1.

Referring to FIGS. 1 and 2, an automatic assembly machine in accordance with the preferred embodiment of the present invention comprises a basis 10, a sliding device 30, a horizontal driving device 60, a mounting device 70, a vertical driving device 80, and a control device 90.

The basis 10 comprises a bottom plate 12 and a framework 14 arranged on the bottom plate 12. A pair of parallel rails 16 is provided on the bottom plate 12. An adjusting nut 18 is installed at one side of the bottom plate 12. The framework 14 comprises a vertical plate 20, a horizontal plate 22 and a pair of mounting plates 23 connecting the vertical plate 20 and the horizontal plate 22. An opening 24 is defined in the vertical plate 20 adjacent to the bottom plate 12, for providing access to the sliding device 30. A vertical hole 26 is defined in the vertical plate 20 above the opening 24, for receiving a tube 27 therein. A plurality of bearings 28 is received in the tube 27. Each bearing 28 defines a through hole 29.

The sliding device 30 comprises a sliding plate 32, a partition plate 34, a seat 38, and a diversion station. The sliding plate 32 is connected to the horizontal driving device 60 at one side thereof. The seat 38 is attached on the sliding plate 32. The diversion station is attached on the sliding plate 32 and comprises a hollow cylinder 48, a post 42 fixed in the cylinder 48, a spring 44 surrounding an upper portion of the post 42, a bushing 46 surrounding a top portion of the post 42 and seated on the spring 44. A cavity 50 is formed between the top of the post 42 and the bushing 46 when the spring 44 is located at its original state. The partition plate 34 is mounted on a top of the diversion station. A top surface of the partition plate 34 is level with a bottom of the tube 27 of the basis 10, for preventing the bearings 28 falling from the tube 27. The seat 38 is mounted on an opposite side of the sliding plate 32 for supporting a fan 40 thereon.

The horizontal driving device 60 is mounted on a leftmost end of the bottom plate 12 opposing the nut 18. The horizontal driving device 60 comprises an extendable rod 62 connected to the sliding device 30. A second adjusting nut 64 is arranged below the horizontal driving device 60. The first adjusting nut 18 and the second adjusting nut 64 cooperatively limit movement of the sliding device 30.

The vertical mounting device 70 is mounted below the horizontal plate 22 and comprises a hollow mounting portion 72, an extendable rod 74, a spring 76 and a movable bushing 78. The vertical driving device 80 is mounted on the horizontal plate 22, for driving the extendable rod 74 to move in the mounting portion 72. The movable bushing 78 movably surrounds the extendable rod 74. A recess 84 is formed between the movable bushing 78 and the extendable rod 74. A projection 82 is formed at a free end of the extendable rod 74 in the recess 84. A diameter of the projection 82 is smaller than a diameter of the through hole 29 of the bearing 28, for guiding the bearing 28 to the recess 84. A size of the recess 84 is smaller than an outer diameter of the bearing 28 for inteferentially receiving the bearing 28 therein. Elastic coefficient of the spring 76 is greater than the elastic coefficient of the spring 44.

Figure 3:
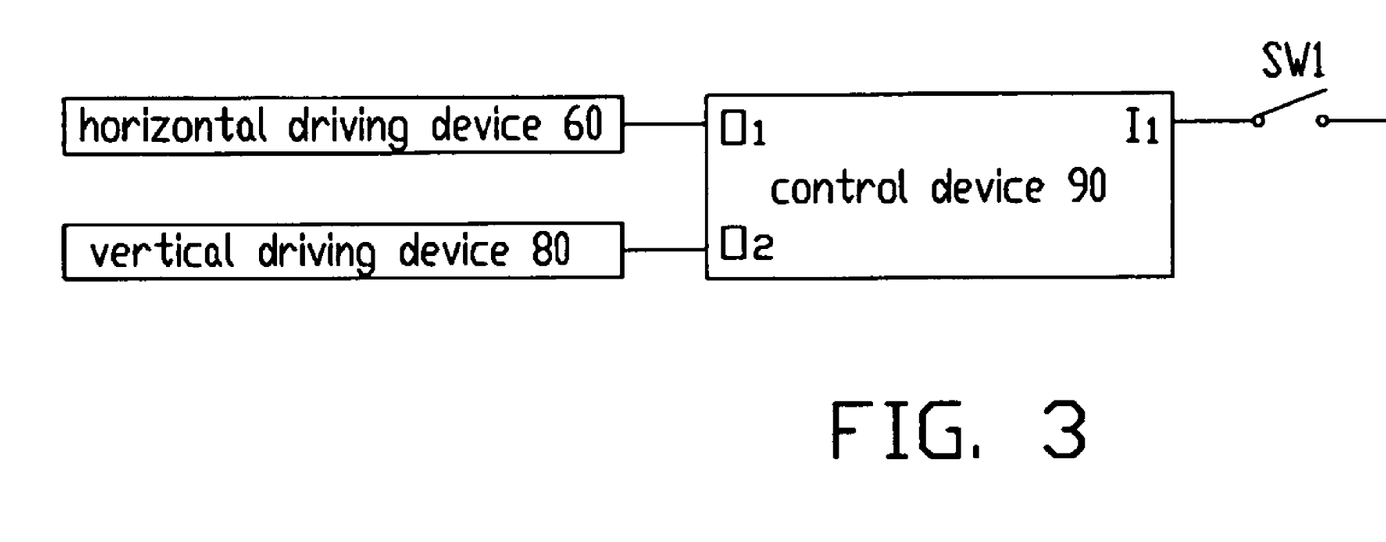
FIG. 3 is a diagram of a horizontal driving device, a vertical driving device and a control device of the automatic assembly machine of FIG. 1.
Figure 4:
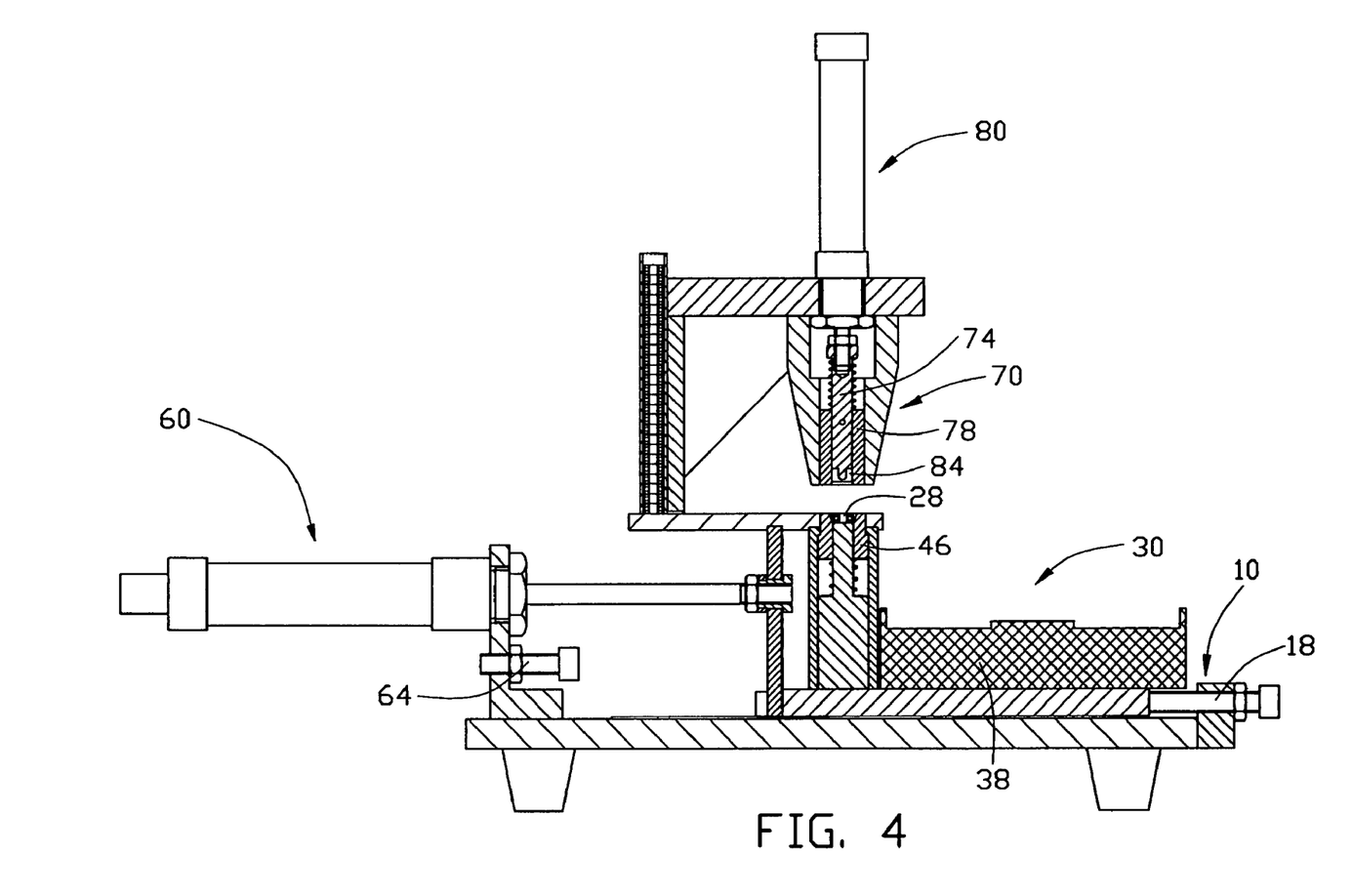
FIGS. 4-10 show stages of the automatic assembly machine mounting one bearing to the fan.
Figure 5:
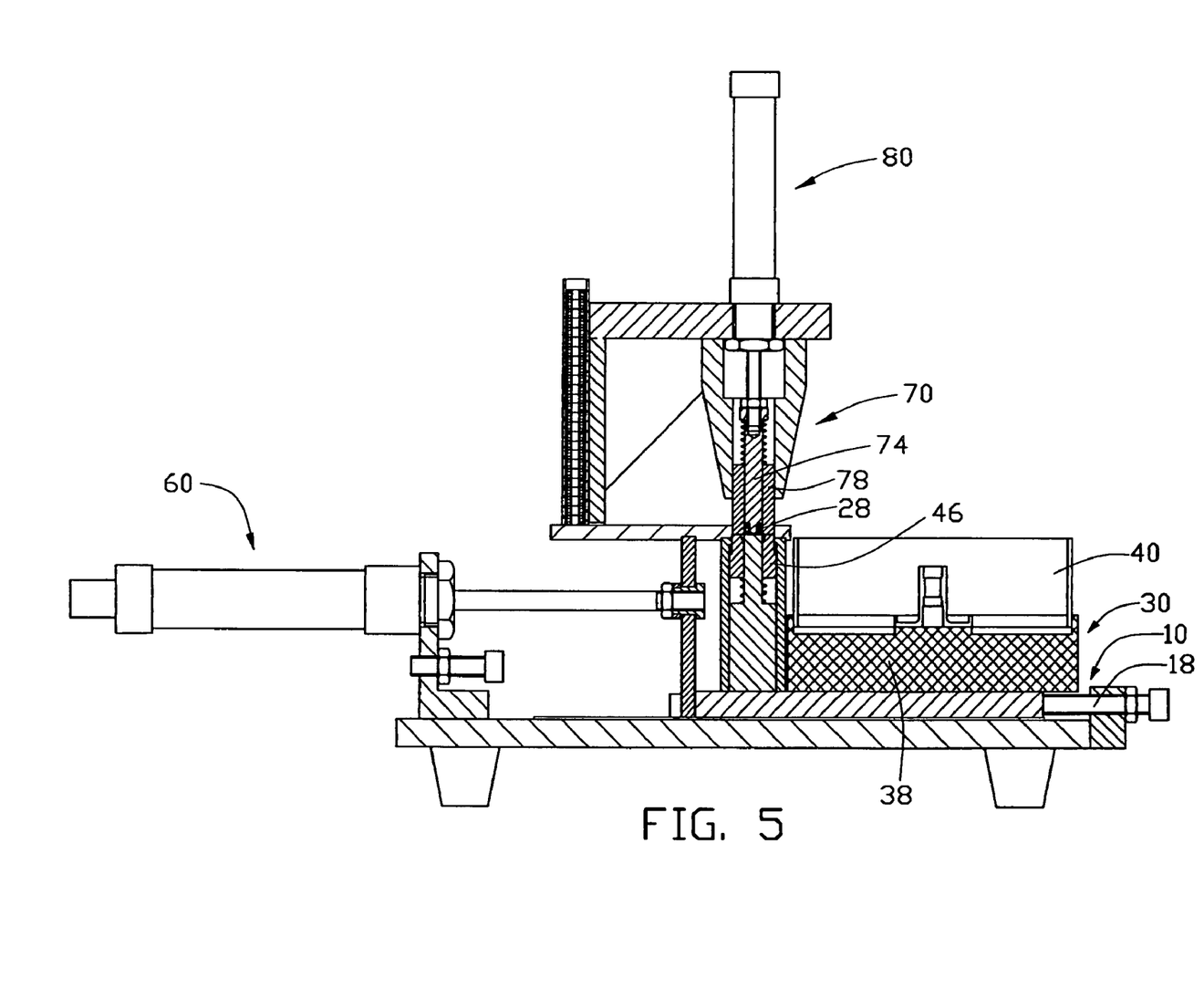
Figure 6:
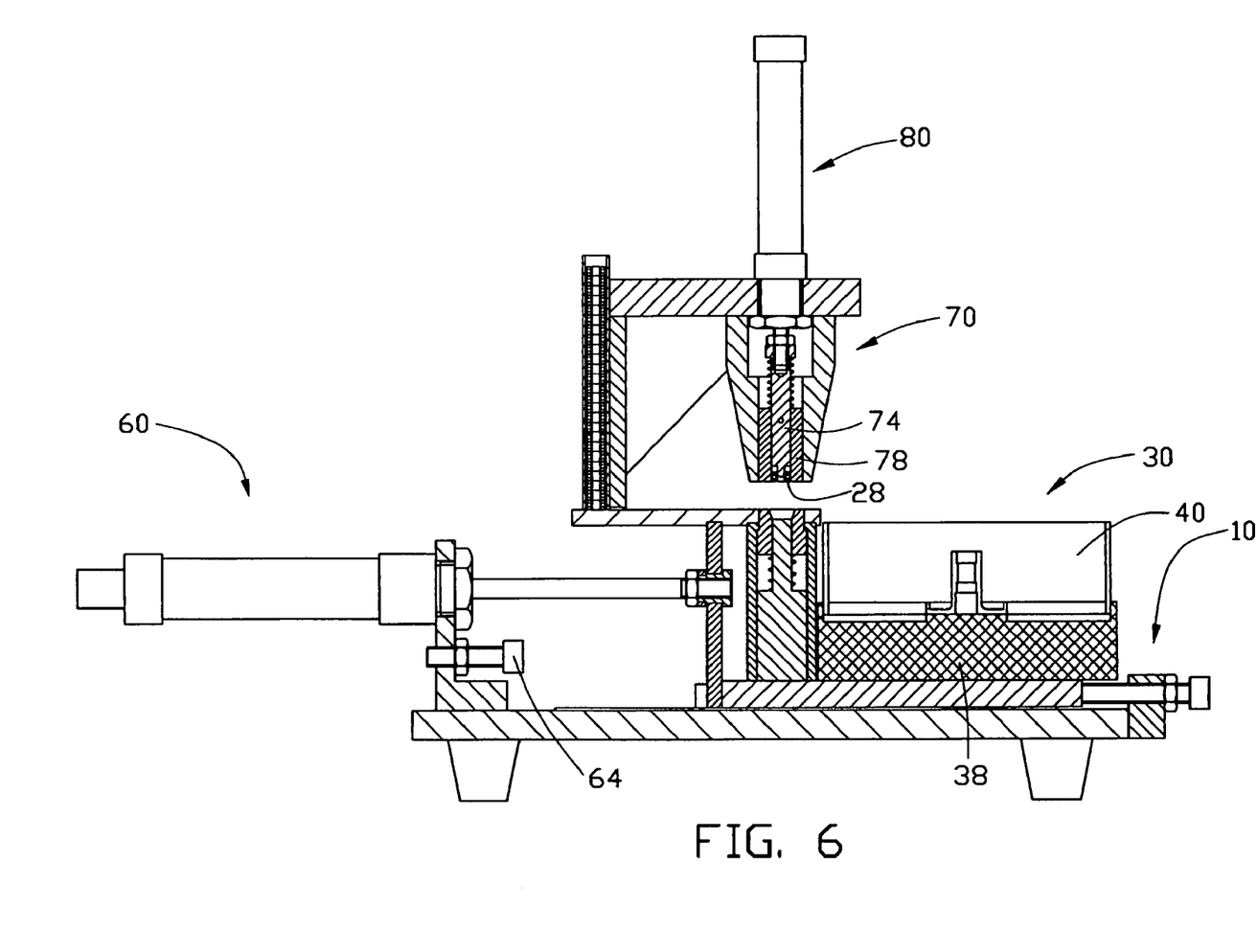
Figure 7:
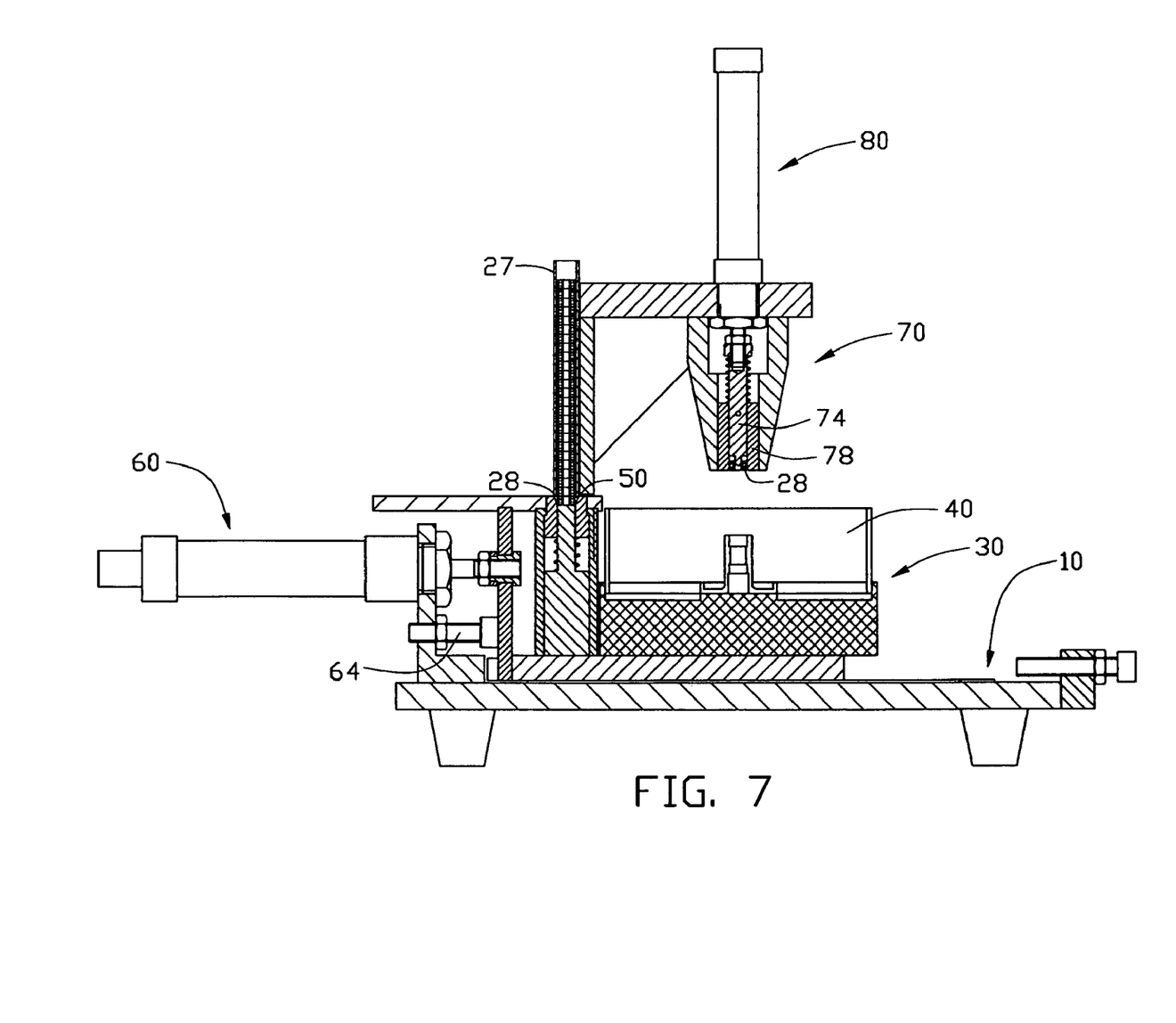
Figure 8:
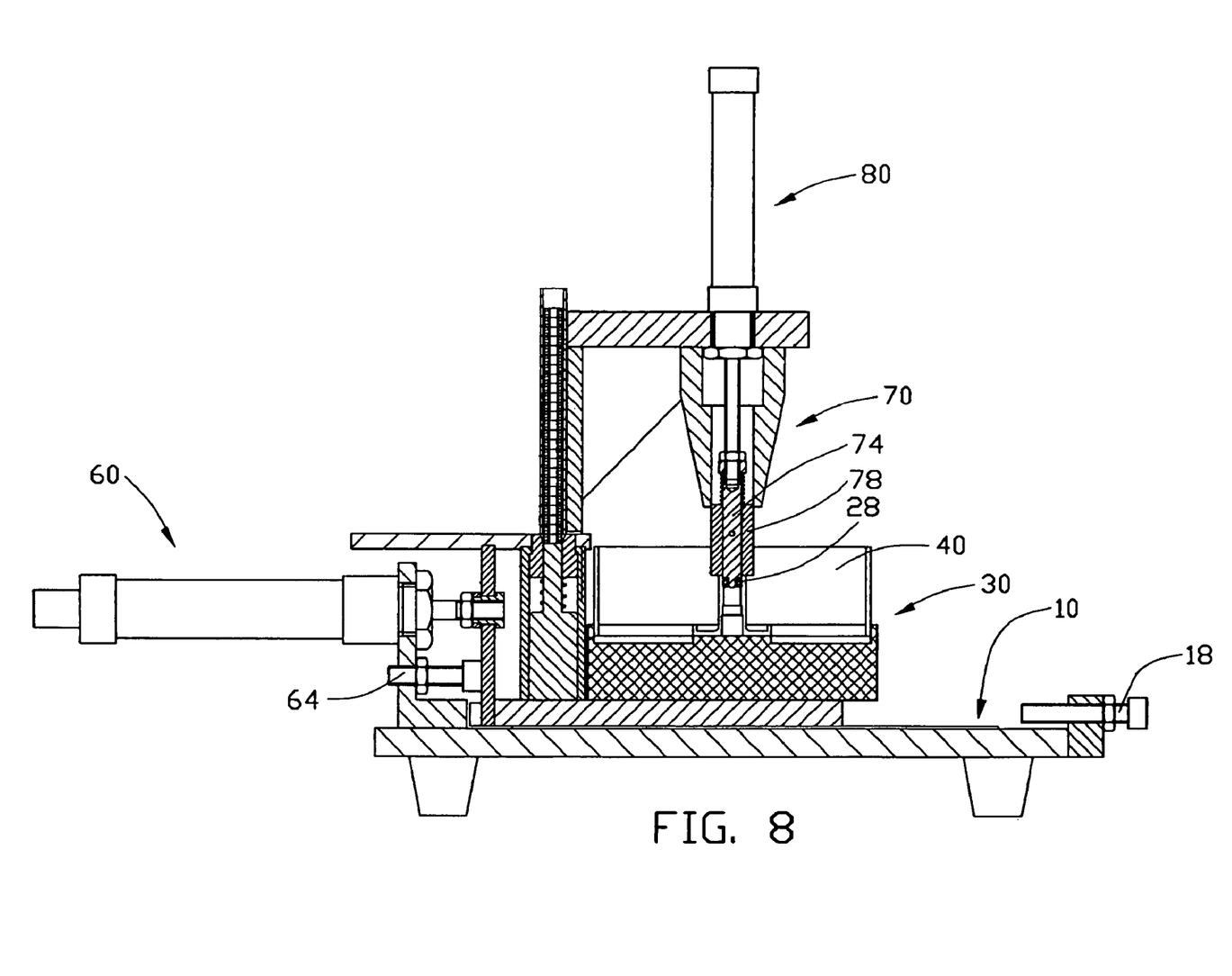
Figure 9:
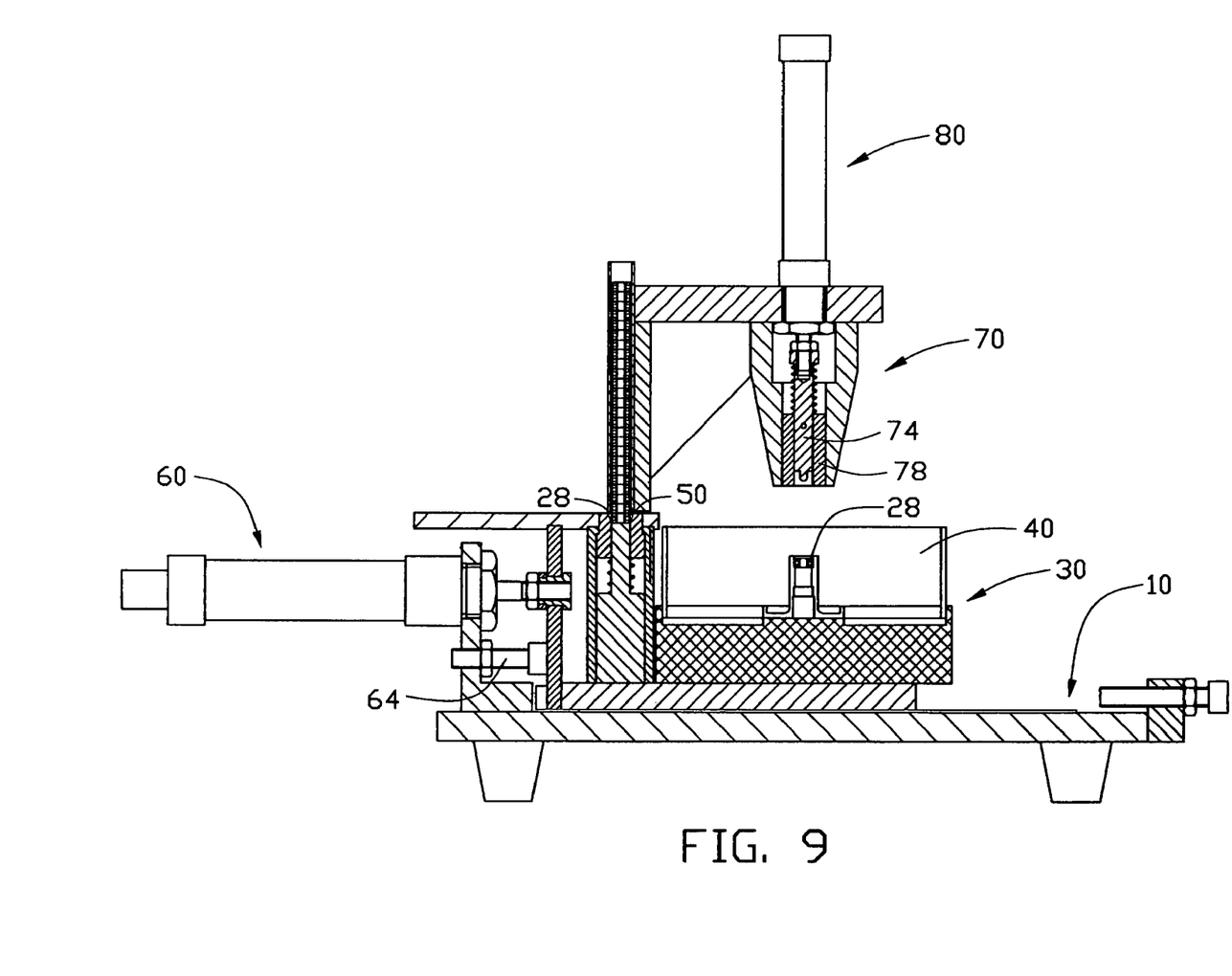
Figure 10:
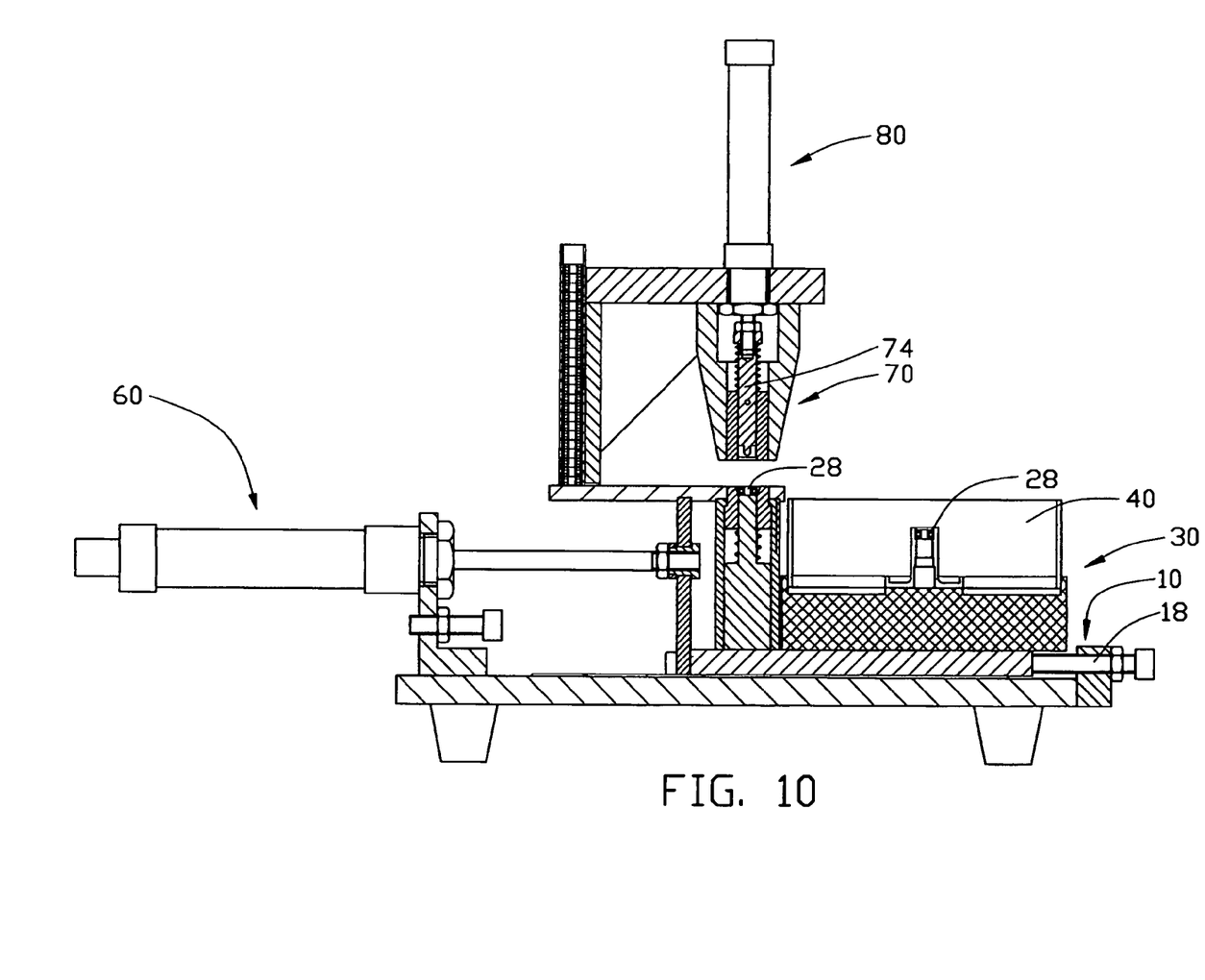

Referring to FIG. 3, the driving device 90 comprises a programmable logic controller. The programmable logic controller will control the movement of the horizontal driving device 60 and the vertical driving device 80 when a switch SWI is closed.

Referring to FIGS. 4-10, before operation, the sliding device 30 locates at its original location and abuts the adjusting nut 18. A bearing 28 is received in the cavity 59 of the diversion station. The movably bushing 78 aligns with the bushing 46. In operation, the fan 40 is placed on the seat 38 of the sliding device 30. The switch SWI is closed. The vertical driving device 80 pushes the extendable rod 74 downwardly to cause the movable bushing 78 to move downwardly. The movable bushing 78 pushes the bushing 46 downwardly until the bushing 46 slides away from the bearing 28 (see FIG. 5). The vertical driving device 80 then pulls the extendable rod 74 upwardly to cause the bushing 78 to move upwardly. The bearing 28 is therefore interferentially received in the recess 84 of the mounting device 70 (see FIG. 6). The horizontal driving device 60 pulls the sliding device 30 to move leftward until the sliding device 30 abuts the adjusting nut 64. At that time, the cavity 50 of the diversion station aligns with the tube 27 and the fan 40 locates below the mounting device 70. Another bearing 28 falls into the cavity 50 from the tube 27 (see FIG. 7). The vertical driving device 80 then pushes the extendable rod 74 and the bushing 78 downwardly until the bushing 78 abuts a top end of a bushing of a motor (not labeled) of the fan 40. The extendable rod 74 pushes the bearing 28 into the bushing of the fan 40 (see FIG. 8). The extendable rod 74 and the movable bushing 78 are then moved upwardly by the vertical driving device 80. The bearing 28 is thus mounted to the fan 40 (see FIG. 9). The horizontal driving device 60 moves the sliding device 30 rightward until it abuts the adjusting nut 18 (see FIG. 10). The fan 40 on which the bearing 28 is mounted can be replaced with the next fan on which the next bearing 28 will be mounted. A period is thus finished.

The automatic assembly machine of the present invention can also be used to mount bearings 28 to motors of other electronic devices, such as hard disk drives.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An automatic assembly machine for mounting bearings to motors, comprising:
    a seat for supporting one motor thereon;
    a diversion station for provisionally holding one bearing thereon;
    a mounting device for mounting said one bearing to said one motor from the diversion station;
    a driving device for driving movement of the seat, the diversion station and the mounting device; and
    a tube for holding the bearings thereon, wherein when the mounting device mounts said one bearing to the motor, the diversion station receives another bearing from the tube;
    wherein the driving device comprises a horizontal driving device for driving the seat and the diversion station to move horizontally, and a vertical driving device for driving the mounting device to move vertically; and
    wherein the diversion station comprises a post and a bushing movably surrounding a top portion of the post with a cavity formed between the cost and the bushing for receiving said one bearing.

2. The automatic assembly machine as claimed in claim 1, wherein the mounting device comprises a movable bushing and an extendable rod movably received in the movable bushing with a recess formed between the movable bushing and the extendable rod for interferentially receiving said one bearing from the cavity.

3. The automatic assembly machine as claimed in claim 2, wherein a distance between an axis of the tube and an axis of the extendable rod of the mounting device is equal to a distance between an axis of the post of the diversion station and an axis of the motor when the motor is placed on the seat.

4. The automatic assembly machine as claimed in claim 2, further comprising a partition plate connecting a bottom end of the tube and a top end of the diversion station for supporting the bearings in the tube when the cavity of the diversion station is not in alignment with the tube.

5. An automatic assembly machine comprising:
    a basis;
    a seat horizontally movably attached on the basis for supporting a motor thereon;
    a tube fixed to the basis for receiving a plurality of bearings therein;
    a diversion station for provisionally holding one bearing from the tube;
    a mounting device vertically movably attached to the basis;
    a horizontal driving device for driving the seat and the diversion station;
    a vertical driving device for driving the mounting device; and
    a control device for controlling periodical movement of the horizontal and vertical driving devices,
    wherein in one period the vertical driving device drives the mounting device to catch said one bearing from the diversion station and then the horizontal driving device drives the seat and the diversion station to move to allow the diversion station to receive another bearing from the tube and the mounting device to mount said one bearing to the motor upon driven of the vertical driving device.

6. The automatic assembly machine as claimed in claim 5, further comprising a sliding plate movably attached on the basis and fixedly attached to the horizontal driving device, the seat and the diversion station fixedly attached on the sliding plate.

7. The automatic assembly machine as claimed in claim 6, wherein a pair of adjusting nuts is installed at opposite sides of the basis for limiting movement of the sliding plate on the basis.

8. The automatic assembly machine as claimed in claim 6, wherein the diversion station comprises a post and a bushing movably surrounding a top portion of the post with a cavity formed between the post and the bushing for receiving said bearing therein.

9. The automatic assembly machine as claimed in claim 8, wherein the mounting device comprises a movable bushing and an extendable rod movably received in the movable bushing with a recess formed between the movable bushing and the extendable rod for interferentially receiving said one bearing from the cavity.

10. The automatic assembly machine as claimed in claim 9, wherein a distance between an axis of the tube and an axis of the extendable rod of the mounting device is equal to a distance between an axis of the post of the diversion station and an axis of the motor when the motor is placed on the seat.

11. The automatic assembly machine as claimed in claim 8, wherein a spring is connected between the bushing and the post.

12. An automatic assembling machine assembly comprising:
   a moveable base including spaced seat and diversion device, said seat holding a motor thereon, the diversion device holding a bearing thereat; and
   a vertically moveable mounting device located above the moveable base, said mounting device gasping the bearing upwardly when said base is moved to a first position where the diversion device is located thereunder and downwardly installing said grasped bearing to the motor when said base is moved to a second position where the seat is located thereunder.

13. The assembly as described in claim 12, further including a container located above said moveable base and holding a plurality of bearings, wherein when said base is located in the second position, the diversion device is located under said container so as to load an outermost one of said bearings to said diversion device ready for being grasped by said mounting device.

14. The assembly as described in claim 13, wherein said base is moved along a linear direction defined between the mounting device and the container.

15. The assembly as described in claim 13, wherein said bearings are stacked on one another, and the outermost one of said bearings is loaded to the diversion device by gravity when said base is located in the second position.

16. The assembly as described in claim 15, wherein the outermost one of said bearings is blocked by a horizontal plate of the base for not being dropped downward out of the container when said base is moved from the second position to the first position.

17. The assembly as described in claim 12, wherein said diversion device is equipped with a spring device to provide resiliency in a vertical direction for cooperation with the mounting device.

* * * * *